United States Patent
Yu et al.

(10) Patent No.: US 7,853,619 B2
(45) Date of Patent: Dec. 14, 2010

(54) STORAGE MODEL FOR LARGE OBJECT COLUMNS

(75) Inventors: Qin Yu, Belmont, CA (US); Muralidhar Krishnaprasad, Fremont, CA (US); Subramanian Muralidhar, Fremont, CA (US); Thomas Chang, Redwood Shores, CA (US); Susan Kotsovolos, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1126 days.

(21) Appl. No.: 10/949,895

(22) Filed: Sep. 23, 2004

(65) Prior Publication Data

US 2006/0075006 A1   Apr. 6, 2006

(51) Int. Cl.
G06F 7/00 (2006.01)
G06F 17/30 (2006.01)

(52) U.S. Cl. .................................... 707/795; 707/812
(58) Field of Classification Search .................. 707/205, 707/201
See application file for complete search history.

(56) References Cited

U.S. PATENT DOCUMENTS

| | | | | |
|---|---|---|---|---|
| 5,873,093 A | * | 2/1999 | Williamson et al. | 707/103 R |
| 5,999,943 A | * | 12/1999 | Nori et al. | 707/104.1 |
| 6,012,067 A | * | 1/2000 | Sarkar | 707/103 R |
| 6,065,013 A | * | 5/2000 | Fuh et al. | 707/103 R |
| 6,658,437 B1 | * | 12/2003 | Lehman | 707/205 |
| 2006/0004838 A1 | * | 1/2006 | Shodhan et al. | 707/102 |
| 2006/0047670 A1 | * | 3/2006 | Yu et al. | 707/100 |

* cited by examiner

*Primary Examiner*—Charles Rones
*Assistant Examiner*—Harold A Hotelling
(74) *Attorney, Agent, or Firm*—Aka Chan LLP

(57) ABSTRACT

Methods and apparatus for enabling a plurality of table columns arranged to be associated with large objects (LOBs) to share a single LOB data segment within a database are disclosed. According to one aspect of the present invention, a method for allocating space associated with at least a first column arranged to accommodate LOB data and a second column arranged to accommodate LOB data includes allocating a first LOB data segment. The method also includes associating both the first column and the second column with the first LOB data segment.

51 Claims, 6 Drawing Sheets

STORAGE MODEL FOR LARGE OBJECT COLUMNS

BACKGROUND OF THE INVENTION

1. Field of the Invention

The present invention relates to database systems. More specifically, the invention relates to enabling a group of large object (LOB) columns of a table, or a set of tables, within a database to effectively share a single LOB data segment.

2. Description of the Related Art

The amount of memory space, as for example memory space in a relational database, that is available in computing systems is typically limited, so it is crucial to efficiently allocate the memory space for usage. As such, the determination of where and how to store data within a computing system may be based at least in part upon how much data is to be stored. For example, in some instances, a relatively small amount of data may be stored as inline data in a column of a table, whereas a relatively large amount of data may be stored as an object that is referenced by the table.

A large object (LOB) data type is often used to handle relatively large documents within a database. That is, a LOB data type is generally a data type in a relational database that is used to deal with large objects or documents. The large objects associated with the LOB data type may be in the form of text, graphics, video, or audio. LOB data types generally include binary LOBs (BLOBs) arranged to store binary data and character LOBs (CLOBs) arranged to store character data.

Tables associated with LOBs may generally store large numbers of byte strings, and may be defined as having one or more LOB columns, i.e., one or more columns which are arranged to be associated with LOB data. As shown in FIG. 1, which is a diagrammatic representation of a relational database which includes a table with LOB columns, a table 14 in database 10 includes columns 16. Specifically, columns 16a-c are LOB columns, or columns which are arranged to substantially accommodate rows of LOB data. Each column 16a-c has an associated, dedicated data segment 18a-c within which LOB objects associated with columns 16a-c may be stored. As shown, LOB column 16a is associated with data segment 18a, LOB column 16b is associated with data segment 18b, and LOB column 16c is associated with data segment 18c.

LOB columns may often store up to approximately four Gigabytes of data by effectively storing indicators in the actual LOB columns that identify LOBs in which data is stored. When a table is created, e.g., using a CREATE TABLE statement, and is expected to contain LOB data types such as a BLOB or a CLOB, a data segment may be allocated for each LOB column associated with the table. The data segment is allocated such that when a LOB is to effectively be stored in a LOB column, the space in the data segment is available for the storage of the LOB. In other words, a data segment is preallocated for each LOB column of a table in anticipation of the storage of LOBs associated with each LOB column. Often, the size of a data segment that is allocated for a LOB column may be fairly significant, as LOBs which may be stored in the data segment may be large. By way of example, if a LOB which is arranged to contain an e-mail message may contain up to approximately 60K bytes, data segments are generally allocated to accommodate LOBs of up to approximately 60K bytes, even though the LOBs may often contain only several hundred bytes.

When a table has a relatively large number of LOB columns, e.g., several hundred LOB columns, the number of data segments allocated for the LOB columns, as well as the size of the data segments, may occupy a substantial amount of space with a database. For example, since the size of string values in an XML document that is stored in a relational database is often unknown, such XML strings may be mapped into LOBs. Within a table, there may be a relatively large number of LOB columns associated with XML data. These LOB columns may also be spread across multiple tables. This implies that a relatively large number of data segments may need to be allocated to accommodate the LOBs into which XML strings are mapped. The allocation of and the maintenance of a relatively large number of data segments may take a significant amount of storage space and time, and, therefore, result in significant performance degradations.

The amount of space which is occupied by a data segment may be specified by LOB storage parameters, e.g., a lob_storage_clause in a CREATE TABLE statement. Because data segments for LOB columns are typically allocated such that LOBs which store a relatively large number of bytes may be accommodated, and the number of data segments may be high, the amount of space reserved for the data segments is often significant. As data is often relatively small, the space allocated for data segments may often be wasted, since the relatively small data may be stored in-line in the columns of the tables, or in the columns of the tables in some instances, instead of in a LOB segment. The space within one data segment that is not used by its associated LOB column may not be utilized, for example, by another data segment or for other purposes within an overall database system. As space within a database is often limited, wasting space which may otherwise be used for other purposes is particularly inefficient.

Therefore, what is needed is a method and an apparatus which enables the space associated with a table, or tables, which contains LOB columns to be efficiently utilized. That is, what is desired is a method and an apparatus which substantially minimizes the amount of space allocated to accommodate LOBs associated with LOB columns of a table in a relational database.

SUMMARY OF THE INVENTION

The present invention relates to enabling a plurality of table columns arranged to be associated with large objects (LOBs) to share a single LOB data segment within a database. According to one aspect of the present invention, a method for allocating space associated with at least a first column arranged to accommodate LOB data and a second column arranged to accommodate LOB data includes allocating a first LOB data segment. The method also includes associating both the first column and the second column with the first LOB data segment.

In one embodiment, associating the first column with the first LOB data segment includes causing a LOB associated with the first column to be arranged to be stored in the first LOB data segment. In another embodiment, associating the second column with the first LOB data segment includes causing a LOB associated with the second column to be arranged to be stored in the first LOB data segment. In still another embodiment, the first column is associated with a first partition and the second column is associated with a second partition, and the first and second partitions may either be in the same table or in different tables.

Allowing more than one LOB column in a table or a plurality of tables, or partitions of one or more tables, of a database to substantially share a LOB data segment into which LOBs may be stored enables memory resources associated with the database to be utilized efficiently. Since data associated with LOB columns is often small, e.g., small enough to be stored in-line within the table columns, the use of LOB data segments for the storage of data associated with the LOB columns is generally such that mapping a plurality of LOB columns into a shared LOB data segment reduces the amount of storage space that is effectively wasted, and improves overall system performance or response time.

According to another aspect of the present invention, a database that is suitable for use in a computing system includes at least one table and a first LOB data segment. The table, or tables, includes a first LOB column and a second LOB column. The first LOB data segment is arranged to store data associated with the first LOB column and the second LOB column, and is mapped to both the first LOB column and to the second LOB column. In one embodiment, data associated with the first LOB column is stored in-line in the first LOB column when the data has a size that is less than a threshold amount. In another embodiment, the first LOB data segment includes a first LOB associated with the first LOB column and a second LOB associated with the second LOB column.

According to still another aspect of the present invention, a method for storing data associated with a first column arranged to accommodate LOB data and a second column arranged to accommodate LOB data which share a LOB data segment includes receiving a first set of data to be stored. The first set of data is associated with the first column. The method also includes determining when the first set of data is of a size that exceeds a threshold, and storing the first set of data in the shared LOB data segment when it is determined that the first set of data is of the size that exceeds the threshold. The first set of data is stored in-line in the first column when it is determined that the first set of data is not of the size that exceeds the threshold.

In one embodiment, the method also includes receiving a second set of data to be stored which is associated with the second column. In such an embodiment, the method also includes determining when the second set of data is of a size that exceeds the threshold, storing the second set of data in the shared LOB data segment when it is determined that the second set of data is of the size that exceeds the threshold, and storing the second set of data in-line in the second column when it is determined that the second set of data is not of the size that exceeds the threshold.

Other features and advantages of the invention will become readily available apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
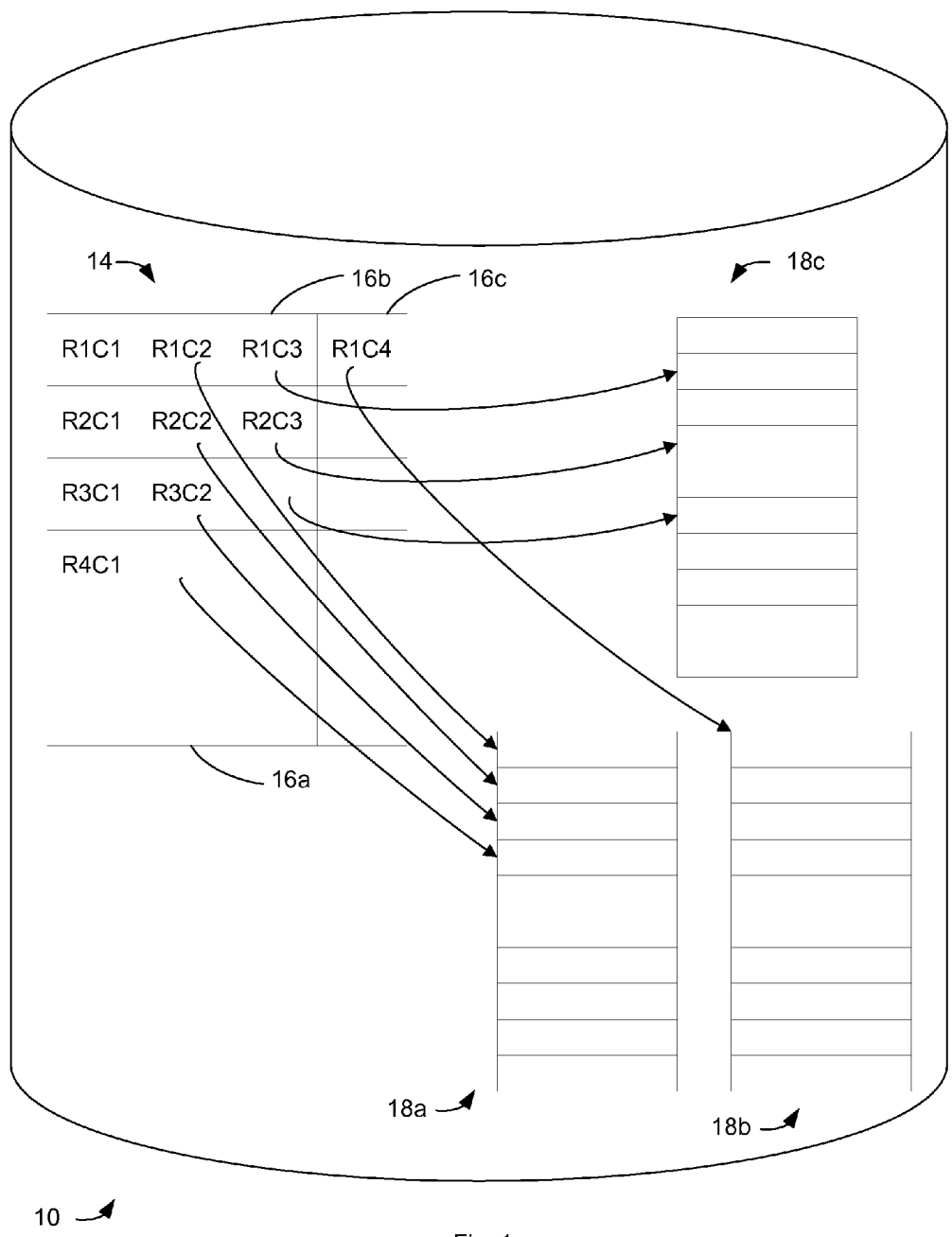
FIG. 1 is a diagrammatic representation of a table with large object (LOB) columns which each have an allocated LOB data segment.

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

Within a table in a database, each column which is arranged to store some variation of a large object (LOB), as for example a binary LOB (BLOB) or a character lob (CLOB), has an associated LOB data segment allocated for the storage of LOBs. The amount of space set aside for each LOB data segment may represent a fairly significant portion of the space available in the database, particularly since space generally needs to be reserved based on the largest possible size of the data. In many applications, LOB data tends to be relatively small, and all LOBs are generally not in use at the same time. Reserving a significant amount of space for each LOB column to have its own LOB data segment is inefficient, as not all the space is likely to be used. In addition to requiring a relatively large amount of space within a database, allocating a large number of LOB data segments is time-consuming and causes severe performance problems.

Rather than mapping a single column in a table that is arranged to store LOB data to a dedicated LOB data segment within a database such as a relational database, more than one column that is arranged to store LOB data may be mapped to a single LOB data segment. That is, a single shared LOB data segment may be created for a group of LOB columns that have the same storage properties. When a single LOB data segment is shared by multiple LOB columns, the amount of overall space within the database that is set aside to store LOB data is reduced. Hence, space within the database may be more efficiently allocated.

When a table has a relatively large number of columns which are arranged to store LOB data, the ability of a plurality of such columns, particularly columns which are expected to store relatively small data, to share a LOB data segment allows for a significant reduction in the amount of space needed to store the LOB data in LOBs. If most of the data to be stored in a group of LOB columns is relatively small and, hence, may be stored in-line in the LOB columns, then an insignificant amount of storage space may generally be needed in the LOB data segment. Hence, having one shared LOB data segment to accommodate any LOB data which may not be stored in-line in a group of LOB columns is generally more than sufficient within a database.

In addition to allowing space to be allocated more efficiently, the ability to have a plurality of LOB columns share a LOB data segment allows the usage of space within the LOB data segment to be more efficient, and also improves the access performance of the LOB data. Co-locating LOBs that are frequently accessed, or updated, together may typically provide significant performance improvements for certain classes of applications, since the need to access multiple segments to obtain data is lessened.

Figure 2:
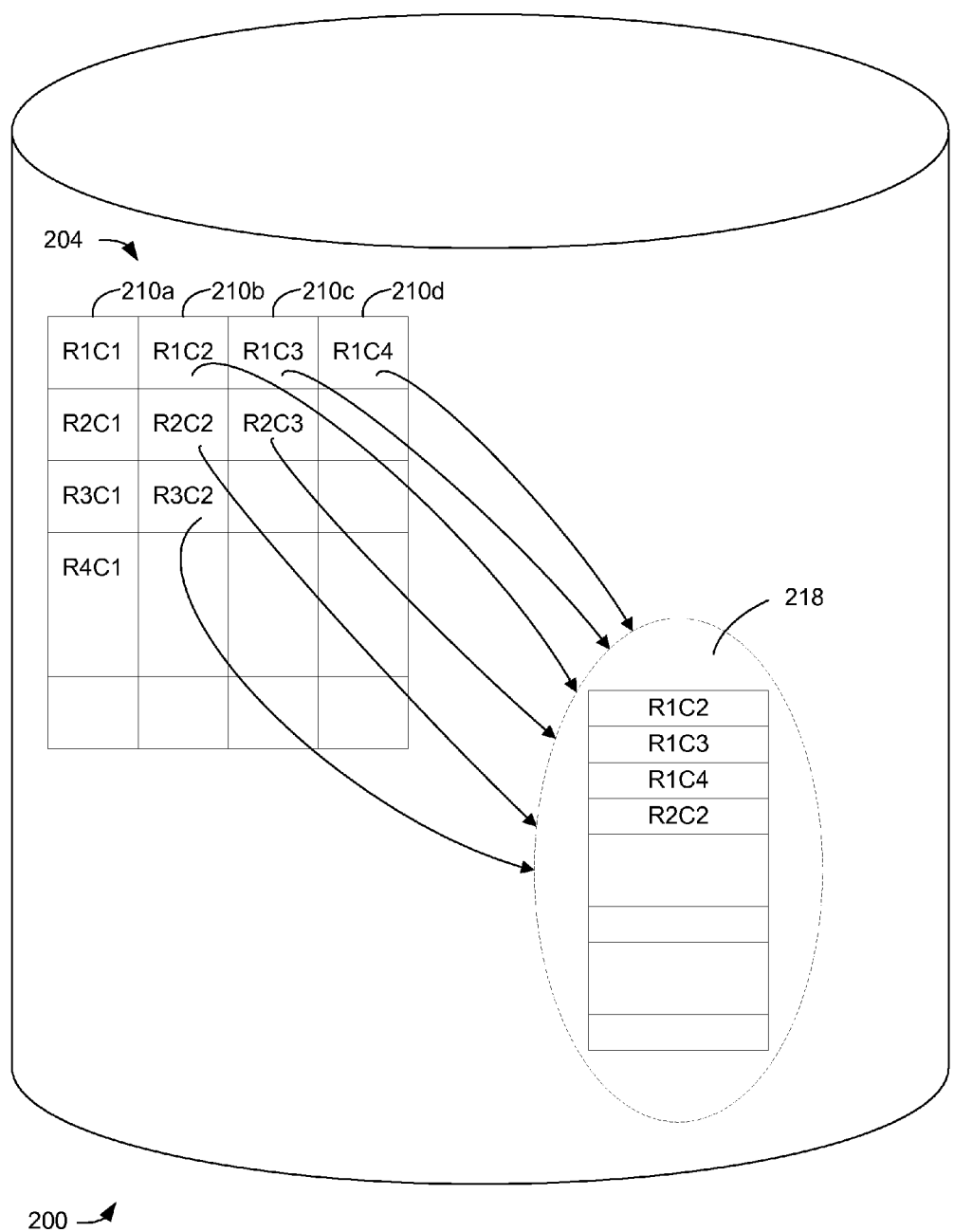
FIG. 2 is a diagrammatic representation of a table with a group of LOB columns which share a LOB data segment in accordance with an embodiment of the present invention.

FIG. 2 is a diagrammatic representation of a table with a group of LOB columns which share a LOB data segment in accordance with an embodiment of the present invention. A table 204 within a database 200 includes a plurality of columns 210. In the embodiment as shown, columns 210b-d are arranged to store LOB data, e.g., XML data. Further, columns 210b-d are arranged to have substantially the same storage properties. A LOB data segment 218 is created within database 200 to enable LOBs associated with columns 210b-d to be stored. That is, columns 210b-d are all mapped to LOB data segment 218.

In general, the storage of LOBs associated with columns 210b-d in LOB data segment 218 allows the data in the LOBs to be accessed relatively quickly as the data associated with columns 210b-d is all either stored in-line within columns 210b-d or in LOB data segment 218. LOB data that is relatively small, e.g., less than approximately 4K bytes in size, is generally stored in-line within columns 210b-d rather than in a LOB within LOB data segment 218. Additionally, the effective consolidation of LOB data into columns 210b-d and shared LOB data segment 218 results in a decrease in the internal fragmentation of LOB data.

It should be appreciated that the order in which LOBs are stored in LOB data segment 218 may vary, i.e., LOBs associated with columns and rows of table 204 may not necessarily be stored in a sequential manner. In general, any new or updated LOB data is stored into LOB data segment 218 in the next open position within LOB data segment 218. For example, if LOB data associated with a particular row of a column 210b-d is updated, the corresponding LOB may be stored into LOB data segment 218 at the next available position, and not stored into the position in which a LOB corresponding to the original LOB data was stored.

When a table such as table 204 is created, as for example through a database CREATE TABLE command, in addition to specifying that at least some of the columns in the table are LOB columns, a user may additionally specify which LOB columns are to share a LOB data segment. LOB columns which are not anticipated to store large data, e.g., values, may generally be specified as sharing a LOB data segment. In some instances, substantially all LOB columns may be expected to store relatively small data and, hence, may all be mapped to a shared LOB data segment.

Figure 3:
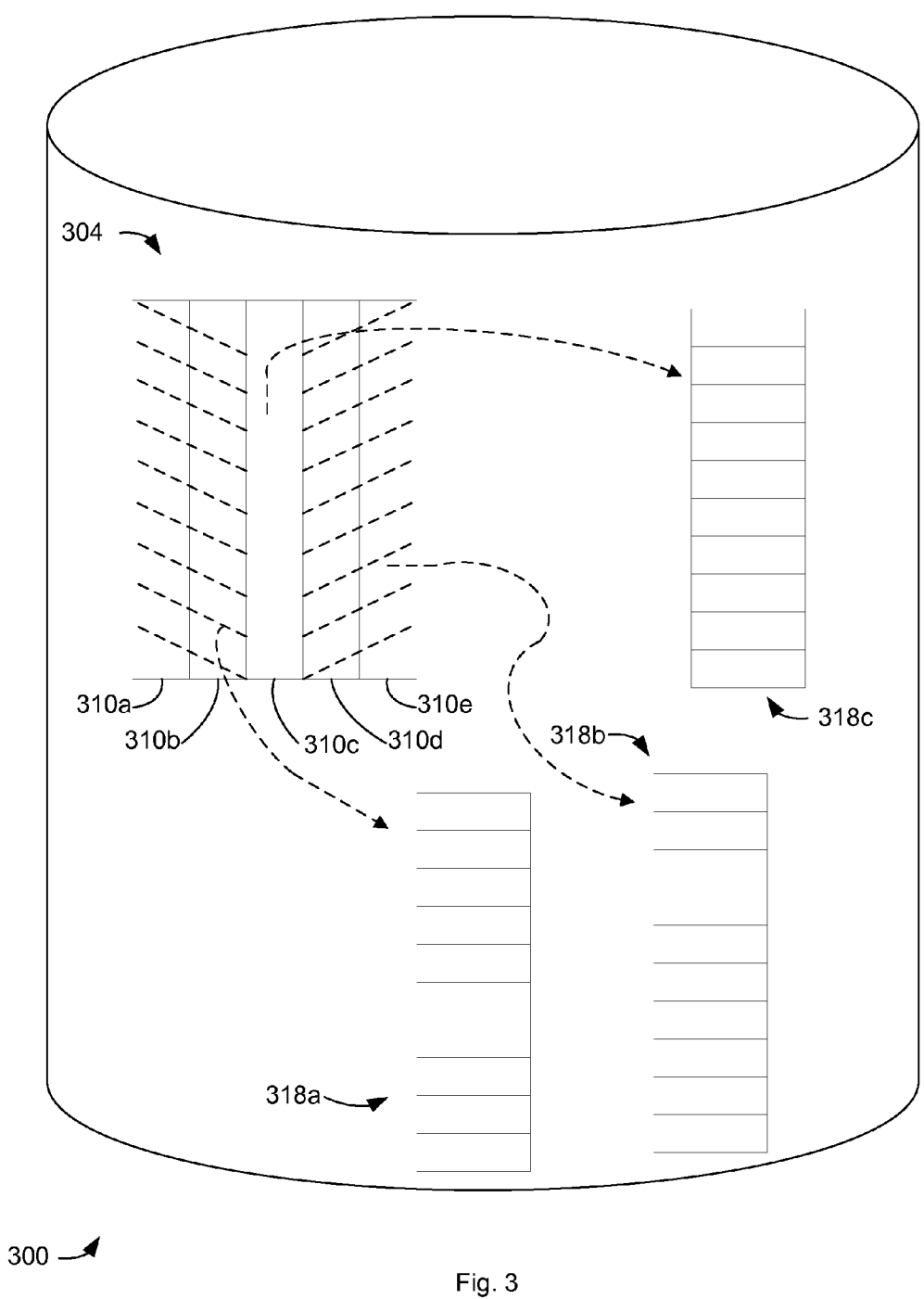
FIG. 3 is a diagrammatic representation of a table with groups of LOB columns which share LOB data segments and a LOB column which has a dedicated LOB data segment in accordance with an embodiment of the present invention.

Some tables may include columns expected to store mostly large data as well as columns expected to store mostly small data. In such tables, at least some of the columns that are expected to store mostly small data, or relatively small amounts of information, may be grouped together such that a shared LOB data segment may be created for the group. Columns which are expected to store mostly large data, or relatively large amounts of information, may each have a dedicated LOB data segment. Referring next to FIG. 3, the mapping of some LOB columns of a table to a shared LOB data segment while other columns of the table may have their own dedicated LOB data segments will be described in accordance with an embodiment of the present invention. Within a database 300, a table 304 includes a plurality of columns 310.

Columns 310a, 310b, 310d, 310e are expected to store mostly small data, or data that has a size that is less than or approximately equal to a particular limit size. This limit may be configurable by users, but systems may provide generally reasonable default limits such as, for example, approximately four thousand bytes. That is, small data may be of a size that is suitable for storage in-line within columns 310a, 310b, 310d, 310e. In the described embodiment, columns 310a, 310b are grouped together and mapped to a shared LOB data segment 318a while columns 310d, 310e are grouped together and mapped to a shared LOB data segment 318b. However, it should be appreciated that columns 310a, 310b, 310d, 310e, which are all expected to store mostly small data, may instead all be mapped to a single shared LOB data segment.

Column 310c is expected to store relatively large data, and is associated with a LOB data segment 318c which is effectively dedicated to column 310c. In other words, LOB data segment 318c is created to store LOB data associated with column 310c. Table 304 efficiently utilizes space in database 300 by allowing columns such as columns 310a and 310b to be grouped together such that they share LOB data segment 318a, while still allowing column 310c to be mapped to its own LOB data segment 318c.

Figure 4:
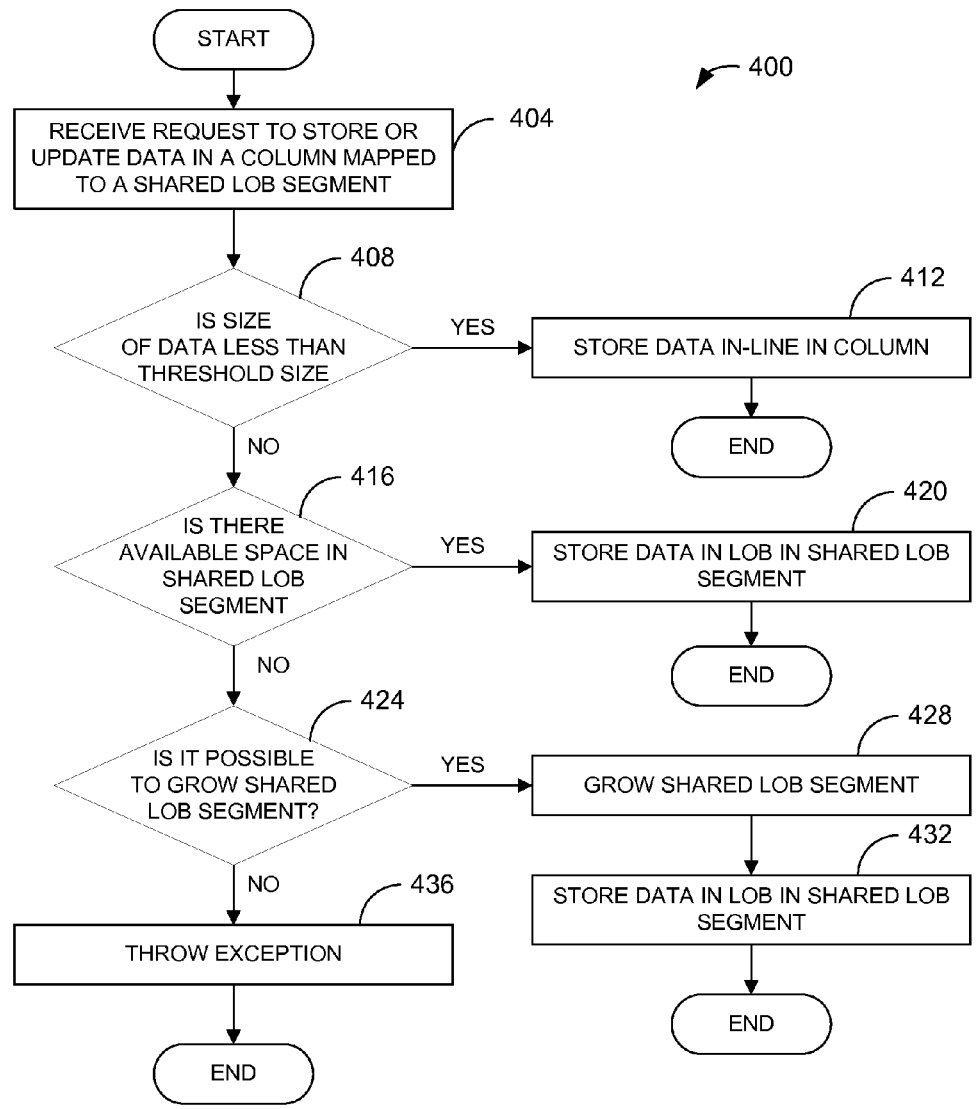
FIG. 4 is a process flow diagram which illustrates one method of storing or updating data in a column of a table that is mapped to a shared LOB data segment in accordance with an embodiment of the present invention.

With reference to FIG. 4, the steps associated with one method of storing or updating data associated with a LOB column that has a shared LOB data segment allocated to it will be described in accordance with an embodiment of the present invention. A process 400 of storing or updating data in a LOB column of a table begins at step 404 in which a request or a command to store or to update data in a LOB column that is mapped to a shared LOB segment is received. Such a request may be received through a database server that is accessed by a client or a user.

Once a request to store or to update data is received, it is determined in step 408 whether the size of the data is less than a threshold size. In one embodiment, the threshold size may be approximately 4K bytes, although it should be appreciated that the threshold size may vary widely. If it is determined that the size of the data is less than the threshold size, then the data is stored in-line in the LOB column of the table in step 412, and the process of storing or updating data is completed.

Alternatively, if the determination in step 408 is that the size of the data is not less than the threshold size, then the indication is that the data may not be stored in-line in the LOB column. Accordingly, in step 416, it is determined if there is available space in the shared LOB data segment to accommodate the data to be stored or updated. When it is determined that there is available space in the shared LOB data segment, i.e., when it is determined that there is space for a LOB in the shared LOB data segment, then the data is stored in a LOB in the shared LOB data segment in step 420, and the process of storing or updating data in a LOB column is completed. As will be understood by those skilled in the art, when data is stored in a LOB in the shared LOB data segment, a pointer or an indicator is typically stored in an appropriate location, e.g., row, in the LOB column to uniquely identify the LOB.

If it is determined in step 416 that there is no available space in the shared LOB data segment for the data or, more specifically, for a LOB in which the data is to be stored, then process flow proceeds to step 424 in which a determination is made regarding whether it is possible to grow the shared LOB data segment. That is, if the shared LOB data segment does not have available space to accommodate a LOB for the data to be stored, it is determined whether the size of the shared LOB data segment may be increased.

When the determination is that it is not possible to grow the shared LOB data segment, then the implication is that it may not be possible to store or to update the data. As such, an exception is thrown in step 436, and the process of storing or updating data is terminated. Alternatively, if the determination is that it is possible to grow the shared LOB data segment, then the shared LOB data segment 428 is allowed to grown in step 428. The amount by which the shared LOB data segment 428 may grow may generally be widely varied. Once the size of the shared LOB data segment is increased, the data is stored in a LOB in the shared LOB data segment in step 432. After the data is stored in the LOB, the process of storing or updating data is completed.

Figure 5:
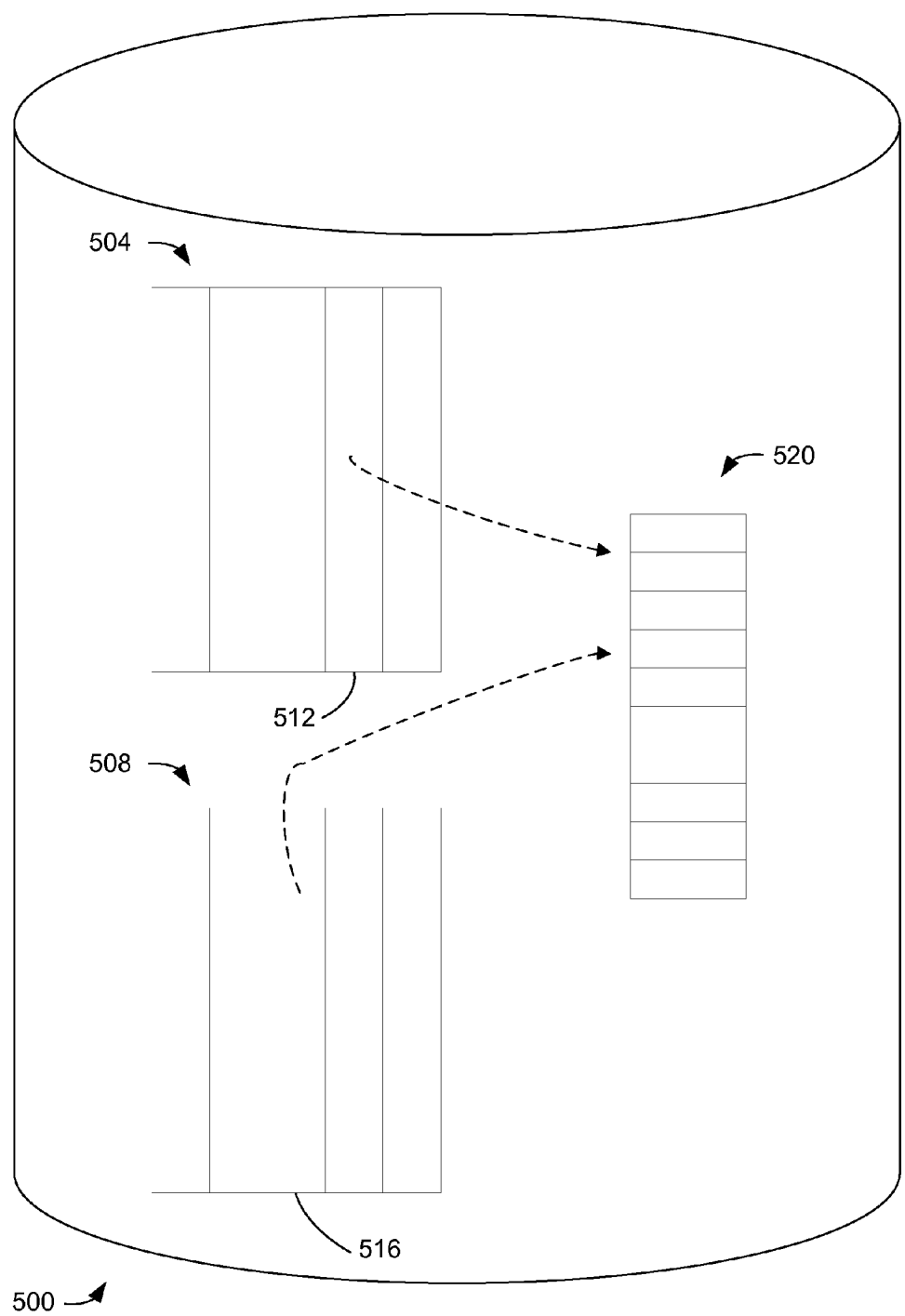
FIG. 5 is a diagrammatic representation of LOB columns from different tables which share a single LOB data segment in accordance with an embodiment of the present invention.

While a group of LOB columns which share a LOB data segment is typically from a single table, it should be appreciated that a group of LOB columns may be formed from LOB columns from different tables. In other words, columns which are effectively mapped to a shared LOB data segment may be from more than one table. FIG. 5 is a diagrammatic representation of a database in which columns from more than one table share a single allocated LOB data segment in accordance with an embodiment of the present invention. A database 500, which may be a relational database, includes a first table 504 and a second table 508. Within first table 504, a column 512 which is a LOB column is mapped to a LOB data segment 520. A column 516 of second table 508, which is a LOB column, is also mapped to LOB data segment 520. Hence, column 512 and column 516 form a group of columns that are mapped to a shared LOB data segment, namely LOB data segment 520.

Enabling columns from different tables, e.g., tables 504 and 508, to be mapped to a shared LOB data segment such as LOB data segment 520 reduces the amount of memory space needed within database 500 to store LOB data, since each table 504, 508 does not need to have at least one of its own LOB data segments. Allowing columns from different tables to share a LOB data segment may be particularly efficient when the columns typically store relatively small amounts of data.

Figure 6:
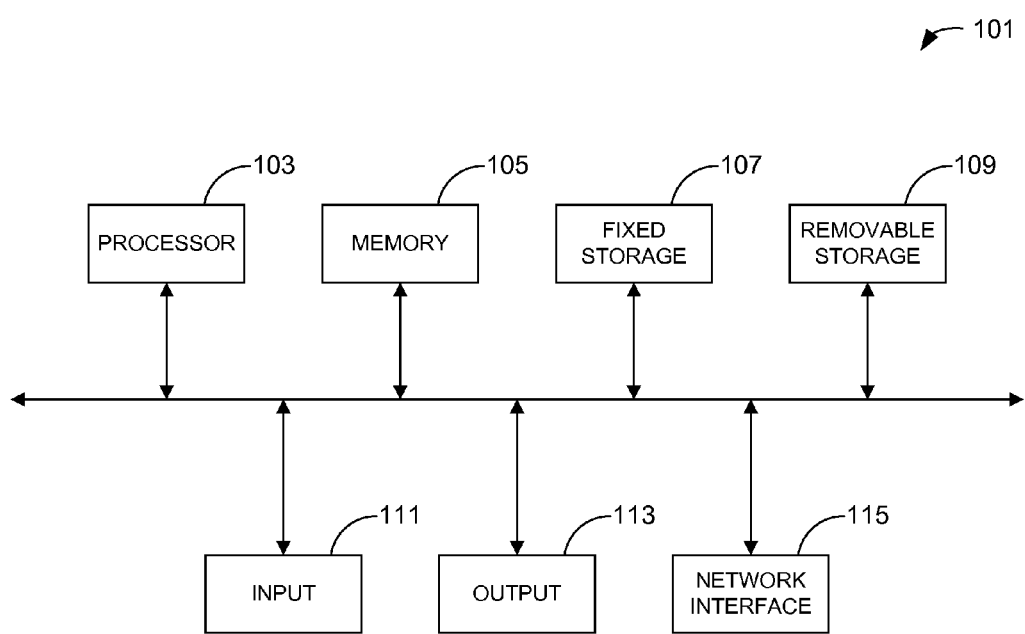
FIG. 6 is a block diagram of components that may be present in computer systems that implement embodiments of the present invention.

FIG. 6 shows a block diagram of components that may be present in computer systems that implement embodiments of the invention. A computer system 101 includes a processor 103 that executes instructions or commands from computer programs, including operating systems. Although processors typically have memory caches also, processor 103 utilizes memory 105, which may store instructions or computer code and data.

A fixed storage 107 may store computer programs and data such that it is typically persistent and provides more storage when compared to memory 105. At present, a common fixed storage is one or more hard drives. A removable storage 109 provides mobility to computer programs and/or data that are stored thereon. Examples of removable storage are floppy disks, tape, CD/ROM, flash memory devices, and the like.

Memory 105, fixed storage 107 and removable storage 109 provide examples of computer readable storage media that may be utilized to store and retrieve computer programs incorporating computer codes or code devices that implement the invention, data for use with the invention, and the like. Additionally, a data signal embodied in a carrier wave, e.g., in a network including the Internet, may be the computer readable storage medium. An input 111 allows a user to interface with the system. Input may be done through the use of a keyboard, a mouse, buttons, dials, or any other input mechanism. An output 113 allows the system to provide output to the user. Output may be provided through a monitor, display screen, LEDs, printer or any other output mechanism.

A network interface 115 allows the system to interface with a network to which it is connected. The system bus architecture of computer system 101 is represented by arrows 117. The components shown in FIG. 6 may be found in many network devices and computer systems. However, components may be added, deleted and combined. For example, fixed storage could be an array of hard drives or the fixed storage could be a file server that is accessed through a network connection. Thus, FIG. 6 is for illustration purposes and not limitation.

Although only a few embodiments of the present invention have been described, it should be understood that the present invention may be embodied in many other specific forms without departing from the spirit or the scope of the present invention. By way of example, although XML data has generally been described as being stored in a LOB column of a table, XML data is just one type of data or information that may be stored in a LOB column.

As will be appreciated by those skilled in the art, LOBs may be in the form of text, graphics, video, or audio. The size of LOBs may also vary widely. Some LOBs, as for example LOBs associated with an e-mail message, may include fewer than approximately 200 bytes. Other LOBs may have sizes of up to approximately 60 K bytes or more. Further, a LOB may generally be a BLOB, a CLOB, or an NCLOB.

While a group of LOB columns has been described as sharing a single LOB data segment, it should be appreciated that a group of LOB columns may share more than one LOB data segment. For instance, if a first shared LOB data segment runs out of space and it is not possible to physically increase the size of that LOB data segment, a second shared LOB data segment may be allocated to the group of LOB columns.

Groups of LOB columns many generally be determined based on any suitable criteria. For example, LOB columns which have the same storage properties may be grouped together to share a LOB data segment if it is determined that the LOB columns are expected to all have scarce and relatively small data. Alternatively, substantially all LOB columns in a table may be grouped together to share a LOB data segment. It should be appreciated that in some embodiments, a user may determine how LOB columns are grouped to share a LOB segment. By way of example, in one embodiment, a user may set a parameter that specifies how LOB columns are to be grouped together to share a LOB segment, or the user may set a parameter that identifies how many LOB columns are to share a LOB segment.

Further, in addition to more than one LOB column in a table or a plurality of tables being arranged to share a LOB data segment, more than one LOB column in partitions of one or more tables of a database may also substantially share a LOB data segment into which LOBs may be stored. That is, LOB columns across partitions of one or more tables may be arranged to share a LOB data segment. A partition is generally a "horizontal slice" of a table. Each partition of a table may have substantially the same shape, i.e., each partition may include portions of the same columns of the table. It should be appreciated that a table may be considered to be the union of partitions that comprise it. The use of shared LOB data segments extends to columns across partitions of the same table, as well columns across partitions of different tables, without departing from the spirit of the scope of the present invention.

In general, the steps associated with the methods of the present invention may vary widely. Steps may be added, removed, altered, and reordered without departing from the spirit or the scope of the present invention. By way of example, LOB data that has a size of less than a threshold amount has generally been described as being stored in-line in a LOB column of a table. In some cases, substantially all LOB data may be stored in a LOB in a LOB data segment without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for allocating space associated with at least one table of a computing system, the at least one table having at least a first column arranged to accommodate large object (LOB) data and a second column arranged to accommodate LOB data, the at least one table being arranged within a database, the method comprising:
   allocating a first LOB data segment associated with the at least one table, wherein the first LOB data segment is arranged within the database;
   associating the first column with the first LOB data segment;
   after the associating the first column with the first LOB data segment, when a size of a first LOB is greater than a first threshold size, storing the first LOB, associated with the first column, in the first LOB data segment at a first location;
   associating the second column with the first LOB data segment; and
   after the associating the second column with the first LOB data segment, when a size of a second LOB is greater than a second threshold size, storing the second LOB, associated with the second column, in the first LOB data segment at a second location subsequent to the first location, wherein the second LOB is different from the first LOB.

2. The method of claim 1 further comprising:
   when the size of the first LOB is not greater than the first threshold size, storing the first LOB, associated with the first column, in-line in the first column; and
   when the size of the second LOB is not greater than the second threshold size, storing the second LOB, associated with the second column, in-line in the second column.

3. The method of claim 1 wherein associating the second column with the first LOB data segment includes causing a LOB associated with the second column to be arranged to be stored wholly in the first LOB data segment.

4. The method of claim 1 wherein the at least one table includes a first table, and the first column and the second column are included in the first table, wherein the first column and second column are part of the first table not as a result of a database join operation.

5. The method of claim 1 wherein the at least one table includes a first table and a second table, and the first column is a part of the first table and the second column is a part of the second table.

6. The method of claim 1 wherein the first column is associated with a first partition of the at least one table and the second column is associated with a second partition of the at least one table,
   wherein each partition comprises two or more records, and the first and second partitions are associated with the first LOB data segment.

7. The method of claim 1 wherein the storing the first LOB, associated with the first column, in the first LOB data segment at a first location comprises storing a first indicator in the first column that points to the first location, and
   wherein the storing the second LOB, associated with the second column, in the first LOB data segment at a second location comprises storing a second indicator in the second column that points to the second location.

8. The method of claim 1 wherein the first LOB, associated with the first column, and the second LOB, associated with the second column, are both stored in the first LOB data segment.

9. A computer program product for allocating space associated with at least one table of a computing system, the at least one table having at least a first column arranged to accommodate large object (LOB) data and a second column arranged to accommodate LOB data, the at least one table being arranged within a database, the computer program product comprising:
   computer code that causes a first LOB data segment associated with the at least one table to be allocated, wherein the first LOB data segment is arranged within the database;
   computer code that causes the first column to be associated with the first LOB data segment;
   computer code that causes the second column to be associated with the first LOB data segment;
   computer code that causes a first LOB to be received, the first LOB being associated with the first column;
   computer code that causes a second LOB to be received, the second LOB being associated with the second column;
   computer code that causes a size of the first LOB to be determined;
   computer code that causes the first LOB, associated with the first column, to be stored in the first LOB data segment when it is determined that the size of the first LOB exceeds a first threshold;
   computer code that causes a size of the second LOB to be determined;
   computer code that causes the second LOB, associated with the second column, to be stored in the first LOB data segment when it is determined that the size of the second LOB exceeds a second threshold; and
   a computer-readable medium that stores the computer codes.

10. The computer program product of claim 9 wherein the computer code that causes the first column to be associated with the first LOB data segment includes computer code that causes the first LOB, associated with the first column, to be arranged to be stored wholly in the first LOB data segment.

11. The computer program product of claim 9 further comprising:
   computer code that causes the first LOB, associated with the first column, to be stored in in-line in the first column when it is determined that the size of the first LOB does not exceed the first threshold; and
   computer code that causes the second LOB, associated with the second column, to be stored in-line in the second column when it is determined that the size of the second LOB does not exceed the second threshold.

12. The computer program product of claim 9 wherein the at least one table includes a first table, and the first column and the second column are included in the first table, wherein the first column and second column are part of the first table not as a result of a database join operation.

13. The computer program product of claim 9 wherein the size of the first LOB exceeds the first threshold and the size of the second LOB exceeds the second threshold.

14. The computer program product of claim 9 wherein the first LOB is stored only in the first LOB data segment and not in the first column, associated with the first LOB.

15. The computer program product of claim 14 wherein the second LOB, different from the first LOB, is stored only in the first LOB data segment and not in the second column, associated with the second LOB.

16. A database in a computing system, the database comprising:
   at least one table stored in a memory device of the computing system, the at least one table having a first large object (LOB) column and a second LOB column; and
   a first LOB data segment, the first LOB data segment being arranged to store data associated with the at least one table, both the first LOB column and the second LOB column being mapped to the first LOB data segment;
   first data, associated with the first LOB column, having a size that exceeds a first threshold amount and being arranged to be stored in the first LOB data segment; and
   second data, associated with the second LOB column, having a size that exceeds a second threshold amount and being arranged to be stored in the first LOB data segment where the first data is stored.

17. The database of claim 16 wherein the first data is stored in a first location in the first LOB data second segment, the second data is stored in a second location in the first LOB data segment, and the database further comprises:
   third data, associated with the first LOB column, having a size that exceeds the first threshold amount and being arranged to be stored in a third location in the first LOB data segment, wherein the second location is between the first and third locations in the first LOB data segment.

18. The database of claim 17 wherein the first threshold amount is user-configurable to be different from a default value for the first threshold amount.

19. The database of claim 16 wherein the first threshold amount is the same as the second threshold amount.

20. The database of claim 16 wherein the first threshold amount is different from the second threshold amount.

21. The database of claim 16 wherein the second data is stored as a LOB wholly in the first LOB data segment.

22. The database of claim 16 wherein the at least one table includes a first table, and the first LOB column and the second LOB column are each associated with the first table.

23. The database of claim 16 wherein the at least one table includes a first table and a second table, the first LOB column being associated with the first table and the second LOB column being associated with the second table.

24. The database of claim 16 wherein the first LOB column is associated with a first partition of the at least one table and the second LOB column is associated with a second partition of the at least one table.

25. The database of claim 16 wherein the first data is different from the second data.

26. The database of claim 16 wherein the first data is stored starting at a first position in the first LOB data segment, and the second data is stored starting at a second position in the first LOB data segment, further comprising:
   a first indicator stored in the first column, the first indicator being arranged to identify the first LOB stored at the first position in the LOB data segment; and
   a second indicator stored in the second column, the second indicator being arranged to identify the second LOB stored at the second position in the LOB data segment.

27. The database of claim 26 wherein the first indicator is stored in the first column and not stored in the second column.

28. A computer-implemented method for storing data associated with at least a first column arranged to accommodate large object (LOB) data and a second column arranged to accommodate LOB data, the first column and the second column each being associated with a shared LOB data segment, the first column, the second column, and the shared LOB data segment being arranged within a database, the method comprising:
   receiving a first set of data to be stored, the first set of data being associated with the first column;
   determining when the first set of data is of a size that exceeds a first threshold;
   storing the first set of data in the shared LOB data segment when it is determined that the first set of data is of the size that exceeds the first threshold;
   storing the first set of data in-line in the first column when it is determined that the first set of data is not of the size that exceeds the first threshold;
   receiving a second set of data to be stored, the second set of data being associated with the second column, wherein the second set of data to be stored is different from the first set of data;
   determining when the second set of data is of a size that exceeds a second threshold;
   storing the second set of data in the shared LOB data segment when it is determined that the second set of data is of the size that exceeds the second threshold; and
   storing the second set of data in-line in the second column when it is determined that the second set of data is not of the size that exceeds the second threshold.

29. The method of claim 28 wherein storing the first set of data in the shared LOB data segment includes storing a first indicator in the first column that is arranged to identify the first set of data and storing the second set of data in the shared LOB data segment includes storing a second indicator in the second column that is arranged to identify the second set of data.

30. The method of claim 28 comprising:
   when the first set of data is of the size that exceeds the first threshold, storing the first set of data in the shared LOB data segment in a first memory location that is open;
   receiving the second set of data to be stored after the first set of data has been stored in the shared LOB data segment; and
   while the first set of data is stored in the shared LOB data segment, determining that the second set of data is of the size that exceeds the second threshold, and storing the second set of data in the shared LOB data segment, where the first set of data is stored, in a second memory location that is open, the second memory location being different from and after the first memory location of the shared LOB data segment.

31. The method of claim 28 wherein the first threshold and the second threshold are a same size value.

32. The method of claim 28 wherein the first column and the second column are part of a first table.

33. The method of claim 28 wherein the storing the first set of data in the shared LOB data segment when it is determined that the first set of data is of the size that exceeds the threshold and the storing the second set of data in the shared LOB data segment when it is determined that the second set of data is of the size that exceeds the second threshold comprises
   not storing any of the first or second set of data in-line in the first or second columns.

34. The method of claim 28 wherein the storing the first set of data in the shared LOB data segment when it is determined that the first set of data is of the size that exceeds the threshold and the storing the second set of data in the shared LOB data segment when it is determined that the second set of data is of the size that exceeds the second threshold comprises storing the first set of data entirely in the LOB data segment and storing the second set of data, associated with the second column, entirely in the LOB data segment along with the first set of data, which is associated with the first column.

35. The method of claim 28 wherein the storing the first set of data in the shared LOB data segment when it is determined that the first set of data is of the size that exceeds the threshold comprises storing the first set of data starting with the LOB data segment, and wherein storing the second set of data in-line in the second column when it is determined that the second set of data is not of the size that exceeds the second threshold comprises not storing any of the second set of data in the LOB data segment.

36. The method of claim 35 comprising:

receiving a third set of data to be stored, the third set of data being associated with the second column, wherein the third set of data to be stored is different from the first and second sets of data;

determining when the third set of data is of a size that exceeds the second threshold;

storing the third set of data, associated with the second column, in the shared LOB data segment, along with the first set of data associated with the first column, when it is determined that the third set of data is of the size that exceeds the second threshold, wherein the second set of data, associated with the second column, is not stored in the shared LOB data with the first and third sets of data.

37. A computer-implemented method for allocating space associated with at least one table of a computing system, the at least one table having at least a first column and a second column, the at least one table being arranged within a database, the method comprising:

allocating a first data segment, associated with the at least one table, to store data associated with the first and second columns, wherein the first data segment is arranged within the database;

associating the first column with the first data segment;

associating the second column with the first data segment;

receiving a first LOB to be stored, the first LOB having a first size greater than a first threshold;

receiving a second LOB to be stored, the second LOB having a second size greater than a second threshold; and storing both the first LOB, associated with the first column, and the second LOB, associated with the second column, in the first LOB data segment.

38. The method of claim 37 wherein the first LOB is stored in a first position in the first LOB data segment, further comprising:

receiving a request to modify the first LOB;

modifying the first LOB according to the request;

if a size of the modified first LOB is less than the first threshold size, storing the modified first LOB in-line in the first column; and if the size of the modified first LOB is not less than the first threshold size, determining if there is available space in the first data segment to store the modified first LOB, wherein if there is available space in the first data segment to store the modified first LOB, storing the modified first LOB at a second position in the first LOB data segment, the second position different from the first position, and if there is not available space in the first data segment to store the modified first LOB, determining if a size of the first data segment can be increased.

39. The method of claim 38 wherein the second position in the first data segment is a next open location after the first position in the first data segment.

40. The method of claim 38 further comprising:

if it is determined that the size of the first data segment can be increased, increasing the size of the first data segment; and if it is determined that the size of the first data segment cannot be increased, throwing an exception.

41. The method of claim 37 wherein the at least one table includes a first table and a second table, and the first column is a part of the first table and the second column is a part of the second table.

42. The method of claim 37 further comprising:

receiving a third LOB to be stored, the third LOB associated with a third column and having a third size greater than a third threshold; and storing the third LOB, associated with the third column, in the first LOB data segment.

43. A computer program product for storing data associated at least a first column arranged to accommodate large object (LOB) data and a second column arranged to accommodate LOB data, the first column and the second column each being associated with a shared LOB data segment, the first column, the second column, and the shared LOB data segment being arranged within a database, the computer program product comprising:

computer code that causes a first set of data to be stored to be received, the first set of data being associated with the first column;

computer code that causes a determination of when the first set of data is of a size that exceeds a first threshold;

computer code that causes the first set of data to be stored in the shared LOB data segment when it is determined that the first set of data is of the size that exceeds the first threshold;

computer code that causes the first set of data to be stored in-line in the first column when it is determined that the first set of data is not of the size that exceeds the first threshold;

computer code that causes a second set of data to be stored to be received, the second set of data being associated with the second column;

computer code that causes a determination of when the second set of data is of a size that exceeds a second threshold;

computer code that causes the second set of data to be stored in the shared LOB data segment when it is determined that the second set of data is of the size that exceeds the second threshold;

computer code that causes the second set of data to be stored in-line in the second column when it is determined that the second set of data is not of the size that exceeds the second threshold; and a computer-readable medium that stores the computer code.

44. The computer program product of claim 43 wherein computer code that causes the first set of data to be stored in the shared LOB data segment includes computer code that causes a first indicator in the first column to be stored, the first indicator being arranged to identify the first set of data and computer code that causes the second set of data to be stored in the shared LOB data segment includes computer code that causes a second indicator in the second column to be stored, the second indicator being arranged to identify the second set of data.

45. The computer program product of claim 43 wherein the first threshold and the second threshold are a same size value.

46. The computer program product of claim 43 wherein computer code that causes the first set of data to be stored in the shared LOB data segment when it is determined that the first set of data is of the size that exceeds the first threshold and computer code that causes the second set of data to be stored in the shared LOB data segment when it is determined that the second set of data is of the size that exceeds the second threshold comprises computer code that causes not storing any of the first or second set of data in-line in the first or second column.

47. The computer program product of claim 43 wherein computer code that causes the first set of data to be stored in the shared LOB data segment when it is determined that the first set of data is of the size that exceeds the first threshold and computer code that causes the second set of data to be stored in the shared LOB data segment when it is determined that the second set of data is of the size that exceeds the second threshold comprises computer code that causes storing the first set of data entirely in the shared LOB data segment and computer code that causes storing the second set of data, associated with the second column, entirely in the shared LOB data segment along with the first set of data, which is associated with the first column.

48. The computer program product of claim 43 wherein computer code that causes the first set of data to be stored in the shared LOB data segment when it is determined that the first set of data is of the size that exceeds the first threshold comprises computer code that causes the first set of data to be stored starting with the shared LOB data segment, and wherein computer code that causes the second set of data to be stored in-line in the second column when it is determined that the second set of data is not of the size that exceeds the second threshold comprises computer code that causes not storing any of the second set of data in the shared LOB data segment.

49. The computer program product of claim 43 wherein the first set of data is of the size that exceeds the first threshold and the second set of data is of the size that exceeds the second threshold.

50. A computing system comprising:
a database, the database including a first table column arranged to be associated with large object (LOB) data and a second table column arranged to be associated with LOB data, the database further including a first LOB data segment;
means for allocating the first LOB data segment to both the first table column and the second table column;
means for storing a LOB associated with the first table column in the first LOB data segment; and
means for storing a LOB associated with the second table column in the first LOB data segment.

51. The computing system of claim 50 wherein the first table column and the second table column are a part of a first table, the first column and second column being part of the first table not as a result of a database join operation.

* * * * *

UNITED STATES PATENT AND TRADEMARK OFFICE
CERTIFICATE OF CORRECTION

| | | |
|---|---|---|
| PATENT NO. | : 7,853,619 B2 | Page 1 of 1 |
| APPLICATION NO. | : 10/949895 | |
| DATED | : December 14, 2010 | |
| INVENTOR(S) | : Qin Yu et al. | |

It is certified that error appears in the above-identified patent and that said Letters Patent is hereby corrected as shown below:

In column 3, line 47, after "readily" delete "available".

In column 10, line 49, in claim 11, delete "in in-line" and insert -- in-line --, therefor.

Signed and Sealed this
Ninth Day of August, 2011

David J. Kappos
*Director of the United States Patent and Trademark Office*